United States Patent
Verma

(10) Patent No.: US 6,581,093 B1
(45) Date of Patent: Jun. 17, 2003

(54) POLICY VALIDATION IN A LDAP DIRECTORY

(75) Inventor: Dinesh Chandra Verma, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,281

(22) Filed: Oct. 29, 1998

(51) Int. Cl.$^7$ ............................................ G06F 15/177
(52) U.S. Cl. .................. 709/220; 709/217; 709/245; 709/221
(58) Field of Search ............. 705/51, 59; 709/220–229, 709/200, 201, 102, 210–219; 713/176, 178, 180; 700/2

(56) References Cited

U.S. PATENT DOCUMENTS

| | | | | |
|---|---|---|---|---|
| 5,838,918 A | * | 11/1998 | Prager et al. ................ | 709/221 |
| 5,889,953 A | * | 3/1999 | Thebaut et al. ........ | 359/200.51 |
| 6,098,054 A | * | 8/2000 | McCollom et al. ........... | 705/59 |
| 6,119,228 A | * | 9/2000 | Angelo et al. .............. | 713/180 |
| 6,135,646 A | * | 10/2000 | Kahn et al. .................. | 709/217 |
| 6,167,445 A | * | 12/2000 | Gai et al. .................... | 709/223 |
| 6,170,008 B1 | * | 1/2001 | Bahlmann et al. .......... | 709/220 |
| 6,195,587 B1 | * | 2/2001 | Hruska et al. | |

* cited by examiner

Primary Examiner—Ayaz Sheikh
Assistant Examiner—Danh Duong
(74) Attorney, Agent, or Firm—Louis P. Herzberg

(57) ABSTRACT

A method, system and product for resource constrained network elements to validate a set of records in a network repository by verifying validation information stored in the repository by a record validator. A record validator with adequate computational resources validates one or more set of records in a repository such a network directory, and stores validation information records in the repository. The resource-constrained network elements run simple checks to verify the validation information records thus stored. The validation information records may include the modification or creation time of validated records in the repository. The network elements compare the time stored in the validation information records to the actual modification or creation time of records to verify validity information. Cryptographic signature for enhanced security, and validation status records may be used to ensure fault-tolerant behavior.

36 Claims, 12 Drawing Sheets

POLICY VALIDATION IN A LDAP DIRECTORY

FIELD OF THE INVENTION

The present invention is directed to the field of computer networks. It is more specifically directed to validating configuration parameters and policy records stored in a remote repository.

BACKGROUND OF THE INVENTION

The management and administration of a computer network is a complex process for most network operators and administrators. A network generally includes various network elements, such as servers, routers, firewalls, clients and switches. In order to inter-operate properly, each network element is configured with a specific set of parameters. These parameters dictate various aspects of network information, such as, what names and addresses should be used by a specific network element, which application is considered more important, what quality of service should be provided for specific applications in the network, and what type of security should be used for the different types of communication. Taken together, these parameters define the policies which are to be implemented in the network.

For a proper execution of the policies, it is essential that the different network elements be configured so that they support the policies defined for the network. Two network elements that use an encrypted tunnel for communication should use a consistent set of encryption parameters in order to operate properly. To achieve these goals, the different parameters for network element configuration can be stored in a central repository. The policies or configuration parameters of different elements retrieved from the central repository may be used by the different elements to configure themselves. One of the repositories that can be used to store this information is a directory in a network. Other possible repositories may store this information in a database.

When parameters are obtained from a remote repository in the network, there is a question as to whether the parameters are well-formed and could be trusted. Therefore, a network element may validate these parameters or policies prior to using them.

This validation step enables the network element to ensure a fault-free operation. However, in network elements that have limited computational resources, such a validation is not easy to make. This is true of many routers that run on embedded software platforms, or network elements that constitute a wireless, mobile, or home-area network. Due to the serious memory and computation power limitations of these devices, full validation of policies is generally not possible. However, in the absence of any policy validation, network elements run a serious risk of being incorrectly configured and may not work properly.

A solution to the problem of validation for resource-constrained network element is to have a validator, which has sufficient computational resources, to do the bulk of validation for the network elements. The validator stores validation information in the central repository. The network elements themselves have to perform much simpler tests on the validation information stored at the repository to ensure that the entries obtained from the repository are valid. This mechanism guards against accidental changes in configuration information, or a deliberate change by an non-trusted entity. Since the validator is a different entity than the repository of the policies or the network element obtaining the policies, this framework provides for third-party validation of records in the repository.

A solution within this framework for third-party validation needs to resolve some difficulties when policies are obtained from a remote repository. Policies in a database or directory are stored as different types of records or entries. Each entry has a multiplicity of attributes. A network element may obtain only a subset of the attributes stored for any entry in the repository. If a validator creates validation information that is dependent on all attributes of an entry, then an unnecessary burden of obtaining all the attributes is imposed on the network element.

Furthermore, the validation method permits a flexible trust model for the network elements and the validator. In some environments, the network infrastructure between the validator and the network elements may be secure enough so that cryptographic methods to ensure integrity of data may not be needed. In other cases, the infrastructure may not be secure and cryptographic techniques may be needed to ensure that no malicious agent can masquerade as the trusted third-party validator. A flexible validation method should enable efficient validation schemes in a secure environment and secure validation schemes in an insecure environment.

SUMMARY OF THE INVENTION

It is therefore an aspect of the present invention to provide a method, system and/or apparatus by which records stored in a remote repository are validated securely and flexibly by a trusted validator.

It is another aspect of this invention to provide a central repository which stores validation information which permits a secure and flexible validation of entries in the repository.

It is another aspect of this invention to provide a validator which verifies entries in a repository, and stores validation information in the repository for a secure and flexible validation of entries by other network clients.

It is still another aspect of this invention to provide a network element which validates entries obtained from a repository by verifying the validation information stored at that repository.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE INVENTION

Figure 1:
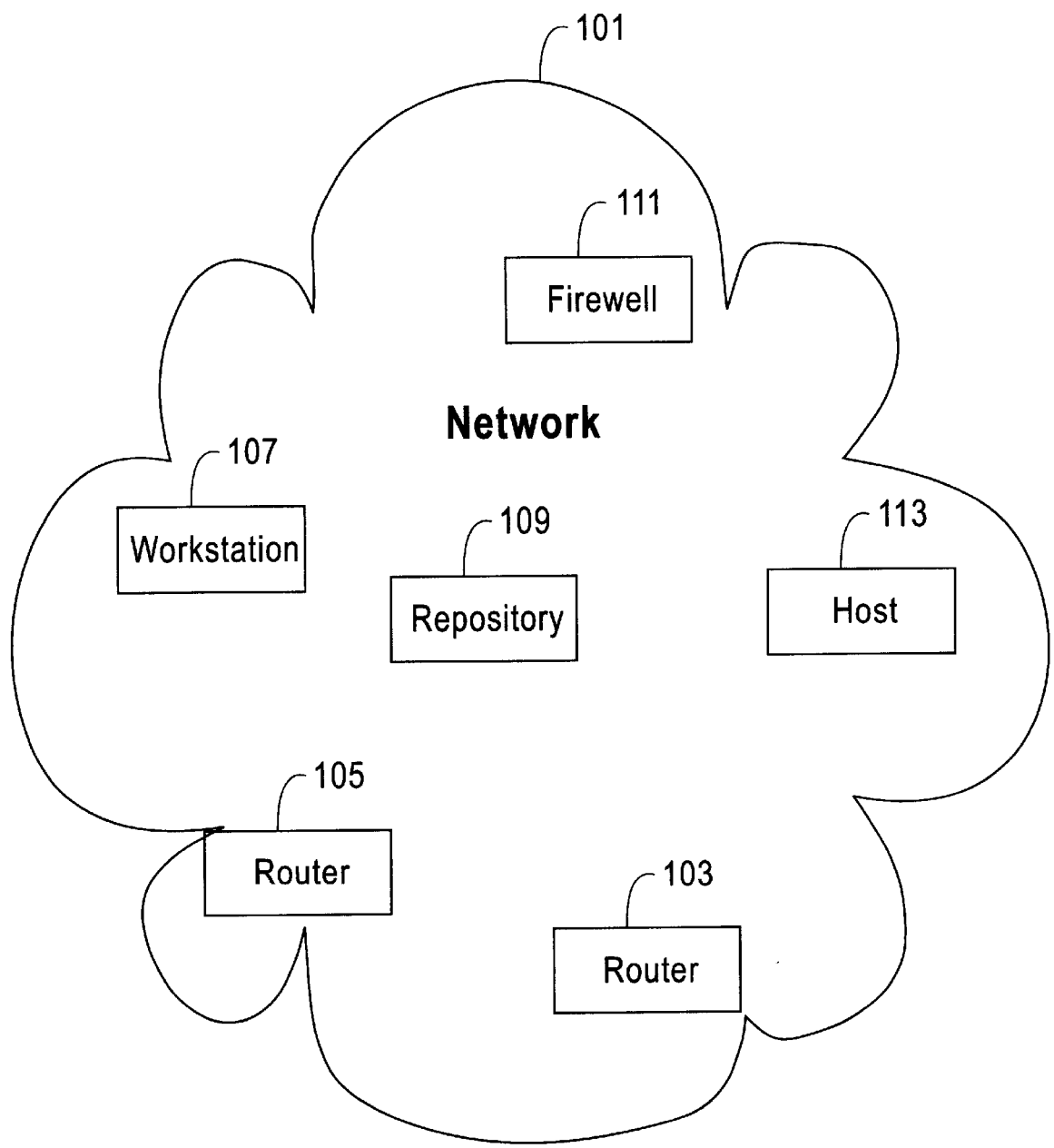
FIG. 1 shows an example block diagram of a network in which the validation scheme outlined in this invention can be used.

FIG. 1 shows a general context of an environment wherein the scheme described herein can be used. The environment has a network 101 which includes a diverse set of network elements. Routers 103 and 105, workstation 107, firewall 111 and host 113 are shown. There could be multiple routers, firewalls, workstations and hosts that form elements of the network. All of these network elements obtain their policies and/or configuration information from a repository 109. The repository of the policy information may be a network directory. Some of the network elements, such as routers may have relatively less computational resources, such as memory or processing power than other network elements such as workstations or hosts.

Figure 2:
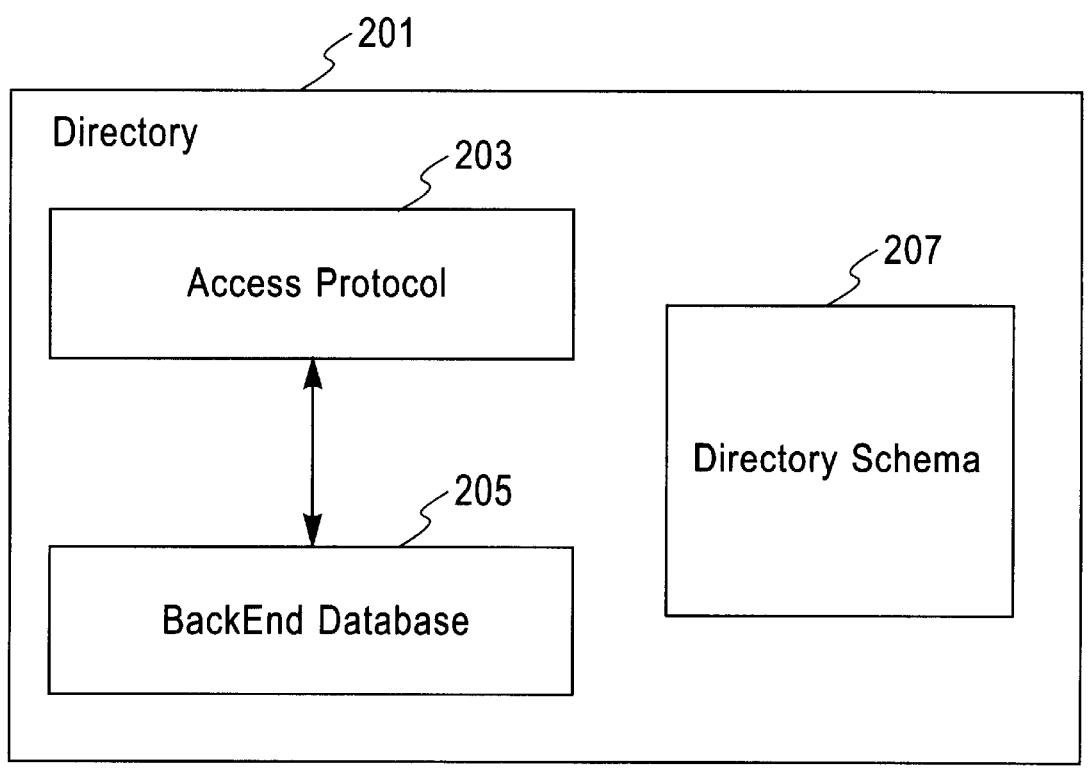
FIG. 2 is a block diagram illustrating the various components that constitute a network directory, which can be used as a repository of policy information.

FIG. 2 illustrates the general structure of a directory which may be used as repository of policy information. The directory 201 consists of an access protocol processor 203 and a database 205. A common instance of the access protocol supported by access protocol processor 203 is the LDAP protocol. Generally, the records that are included in the database 205 have to conform to a set of criteria described in the directory schema 207. The directory schema 207 includes a description of the types of records that can be stored in the directory, and the list of attributes that are required or may be present in each type of record.

Network elements (such as routers, firewalls, hosts, servers) access the directory using a directory access protocol, such as LDAP. The protocol allows a network element to query or change attributes of a specific record, create a new record, or search for all records meeting a specific criteria. The query or search operation may request that only a subset of all attributes that are defined for a type of record be returned. Resource constrained network elements, for example, may wish to query only a small set of attributes which they can handle for their specific needs, even though the directory record may include a large set of attributes.

While we are presenting a directory as the repository of policies, it is obvious to those skilled in the art that other types of repositories, such as database servers, can be used as in the context of this invention.

After a network element has obtained a set of records, it needs to verify that the set of records is valid. The set of records may include one or more records. A set of records is considered valid if all records in it satisfy certain constraints on all or particular attributes and on the values of the attributes in the records. Some of the constraints for a set of required attributes, and/or permitted set of attributes, are implied by the specification of the directory schema and are supported by typical directory servers. Other constraints, such as constraints on the value of a specific attribute, or relationships among the values of different attributes are dependent upon the specific type of records, and are not usually supported by directory or database servers. In general, constraints on records can be divided into these major categories:

Schema Constraints: These specify which attributes are required and which are permitted in a specific type of record. For example, a record of type "Person" may be required to include the attributes of "Name" and "Surname", and may optionally include attributes of "Address", "Age" and/or "Phone Number".

Value Constraints: These specify the limit on the values that may be taken by the attributes of a specific record. For example, in a record of type "Person", the attribute "Age" must have a value greater than 0.

Relation Constraints: These specify the relationship that must exist between the different attributes of a record. These relationships include constraints such as the presence of one attribute requires that another attribute be present. Another constraint may state that the value of one attribute depends upon the value or existence of another attribute in the same record. An example of such a constraint is that if a person has an address in New York, N.Y., then the Phone Number must begin with an area-code of 212.

Consistency Constraints: These specify the relationship that must exist between the attributes of different records. These records may be of the same or different types. An example of such a constraint is that two records with different addresses can not have identical phone numbers. Note that the definition of consistency depends on the specific application context. In some contexts, two records with different addresses may be allowed to have the same phone number.

In the context of network policies, directory entries are often defined to have the semantics of "if Condition then Action", also described as "Condition→Action". In these cases, consistency is defined as the ability that two policies do not specify different actions for the same conditions. Thus if policy 1 states "c1→a1", and policy 2 states "c2→a2", and a1 and a2 are different; then the intersection of c1 and c2 should be empty; or if the intersection of the two conditions is not empty, one of the policies should be identified as being the preferred one.

Figure 3:
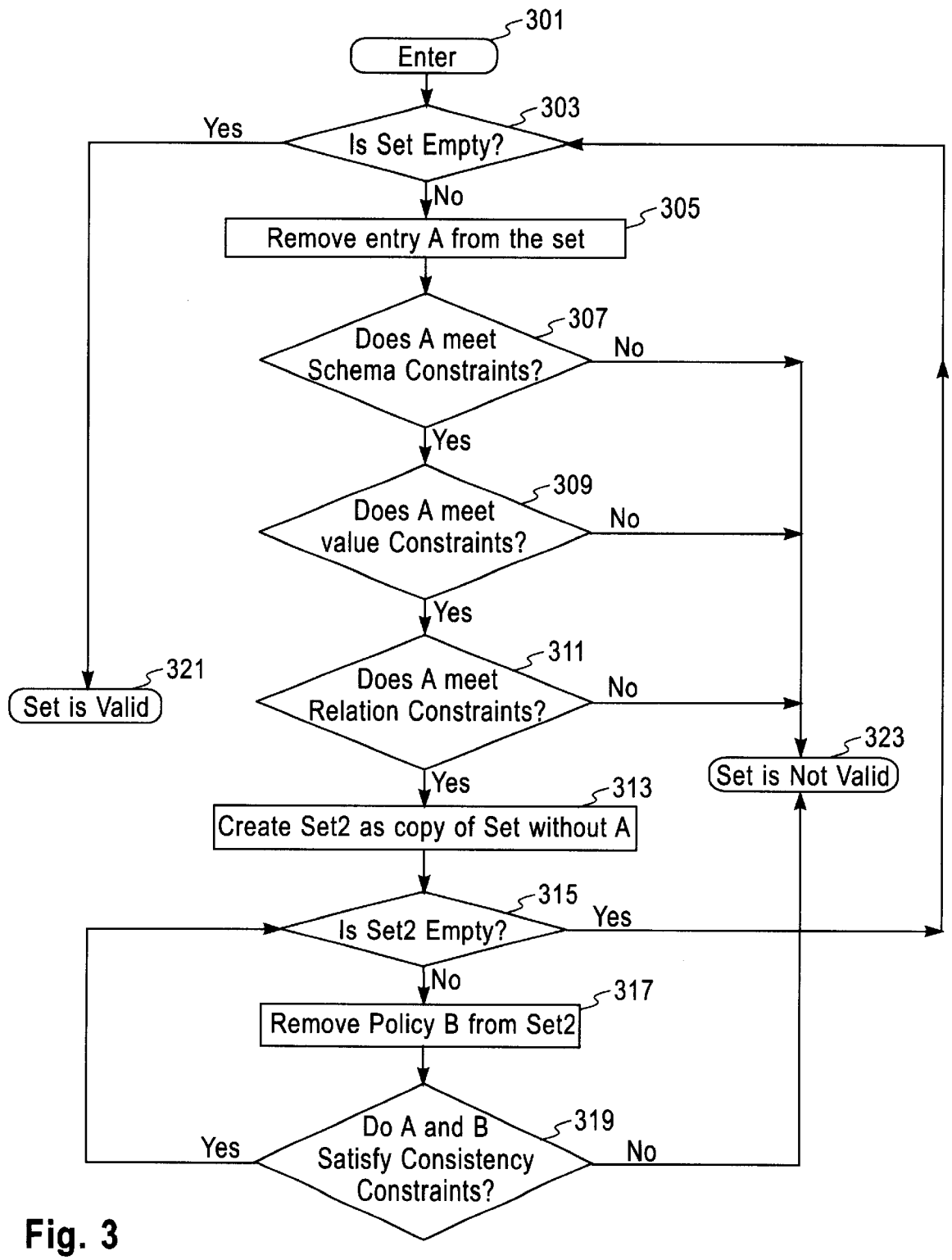
FIG. 3 shows an example flow diagram that illustrates how network policies may be verified to be consistent and well-formed in accordance with the present invention.

In order to verify that a set of records is valid and consistent, the steps outlined in an embodiment shown in FIG. 3 may to be followed. The verification is entered in step 301 to validate a set of records. In step 303, a check is made to determine if the set is empty. If so, it is considered valid by default 321. If the set is not empty, in step 305, a record from the set is selected and removed from it. In step 307, the algorithm checks if the record selected in step 305 satisfies the schema constraints. If it does not, the set is considered invalid and the algorithm terminates in step 323. Otherwise, in step 309, a check is made to determine if the record selected in step 305 satisfies the value constraints. If it does not, the set is considered invalid and the algorithm terminates in step 323. Otherwise, in step 311, a check is made to determine if the record selected in step 305 satisfies the relation constraints. If it does not, the set is considered invalid and the algorithm terminates in step 323. Otherwise, in step 313 a second set is created as a copy of the original set without the record selected in step 305. In step 315, we check if this second set is empty. If so, the validation algorithm continues with step 303, which declares the set of records to be valid 321, since the set is empty. If the second set is non-empty in step 315, the algorithm removes another record from the second set in step 317. It then checks in step 319 that the record selected in step 305 and the record selected in step 317 satisfy the consistency constraints. If not, the set is considered invalid, and the algorithm terminates in step 323. Otherwise, the algorithm continues in the loop at step 315.

The method iterates through each record in the set of records, verifying that it satisfies the schema, relation and value constraints. It also ensures that the record is consistent pair-wise with all other records in the set. To those skilled in the art, it would be obvious how to do the same validation using a different iteration structure, and/or by comparing multiples records at one step for consistency constraint validation, or to extend the definition of consistency constraints to include relations among more than two records.

Figure 4:
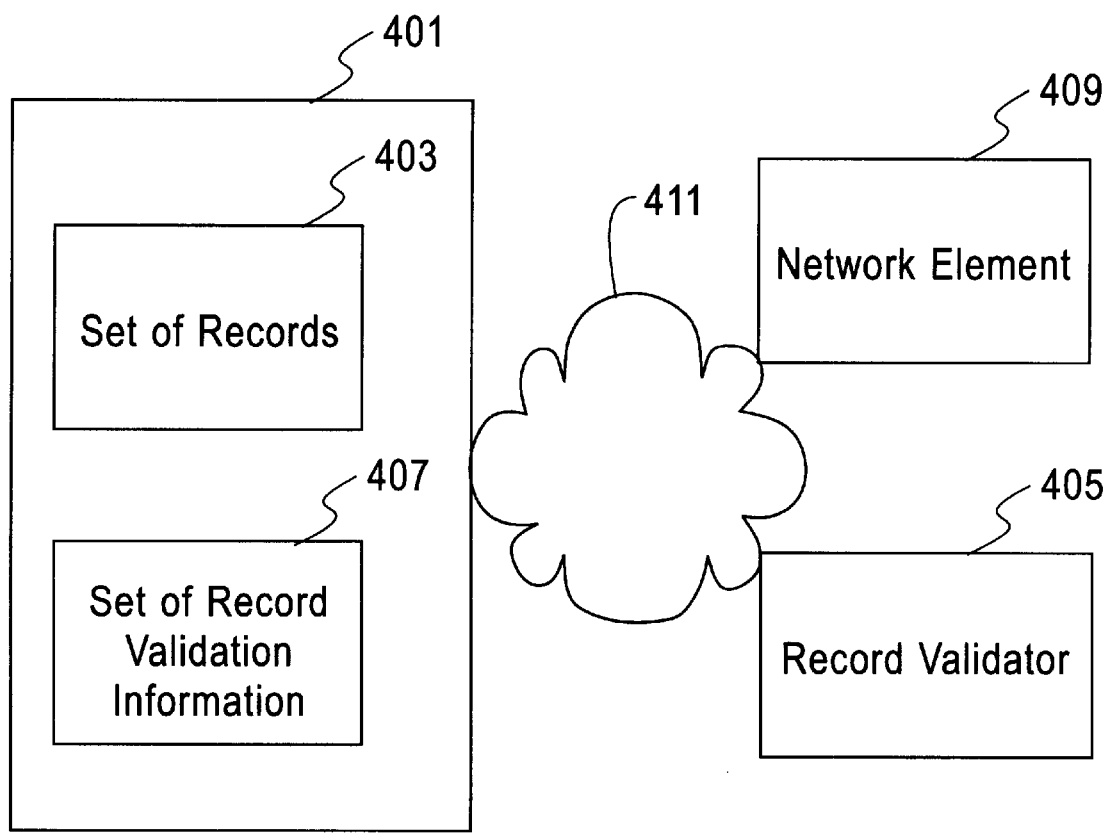
FIG. 4 shows an example block diagram that describes a structure of a central repository within the framework for third party validation in accordance with the present invention.

As apparent from the complexity of the validation method, it is not done easily in network elements with limited computational resources. In this case, an embodiment employing a validation framework shown in FIG. 4 may be used. FIG. 4 shows a repository 401 which stores two types of information, the net of records 403 and the set of record validation information 407. The validation of the set of records 403 stored in the repository 401 is done by means of a record validator 405 which has adequate resources to do the validation. The record validator 405 creates and stores the set of record validation information 407 at the repository 401. A network element 409 obtains the set of records 403 and the set of record validation information 407 from the repository 401. In order to verify that the set of records is indeed valid, the network element 409 verifies the set of record validation information 407. The method to verify the set of record validation information is usually much simpler than the validation method described in FIG. 3.

The record validator 405, the repository 401 and the network element 409 are connected together with the network 411. In different operational environments, different assumptions may be made regarding the nature of the network 411. In some embodiments, an assumption is made that the network 411 is relatively secure, and that there are no malicious users attempting to insert wrong or incorrect policies into the repository. In these cases, the goal of the authentication mechanism is to simply add adequate information stating whether a specific set of records is valid. The validation mechanism need not worry about encrypting the set of record validation information. In other embodiments, a network operator may want to encrypt and not allow general access to the set of record validation information Security assumptions can impact the performance of the system significantly, since these determine the effort a resource-constrained network element needs to employ to verily the record validation information.

The set of record validation information may be created in multiple ways from the set of records. The set of records includes a plurality of records in the directory. One embodiment which constructs a set of record validation information, creates a plurality of record validation information records. One validation information record is constructed for each record in the set of records. The record validation information for a first record may take any of the following formats:

The record validation information is an additional attribute in the first record including a checksum of all the other attributes present in the record.

The record validation information is an additional attribute in the first record including a cryptographic signature of all the other attributes present in the record.

The record validation information is a second (and different type of) record which includes a checksum of all the attributes present in the first record. A reference to the second record may be included as an additional attribute in the first record.

The record validation information is a second (and different type of ) record which includes a cryptographic signature of all the attributes present in the first record. A reference to the second record is included as an additional attribute in the first record.

The record validation information is a second (and different type of ) record which includes the time of creation or modification of the first record. A reference to the second record is included as an additional attribute in the first record.

When a checksum or cryptographic signature is used to create the record validation information, a network element is often required to fetch all attributes of a record in order to ensure that it is valid. Furthermore, cryptographic signatures and checksums are generally expensive operations. Nevertheless, it may be an acceptable solution in many cases.

An advantageous approach is to employ an embodiment that validates the time when an record is created or modified in the repository. This embodiment assumes that the server operating system is not compromised, and therefore attempts to only validate one attribute in a record. By validating the time-stamp of modification or creation, a resource-constrained policy client may easily validate the entire contents of any record. It need not obtain all the attributes of any record from the directory for the purpose of validation, and need only obtain the subset of attributes necessary for its operation. Any attempt to modify a validated record changes the modification time, and thereby invalidate the record validation information. This approach works as long as the security of the repository, in particular, the clock of the repository, is not compromised. However, if the clock of the repository is compromised by security breaches in the operating system, any data stored in the repository becomes suspect, regardless of the validation scheme.

Figure 5A:
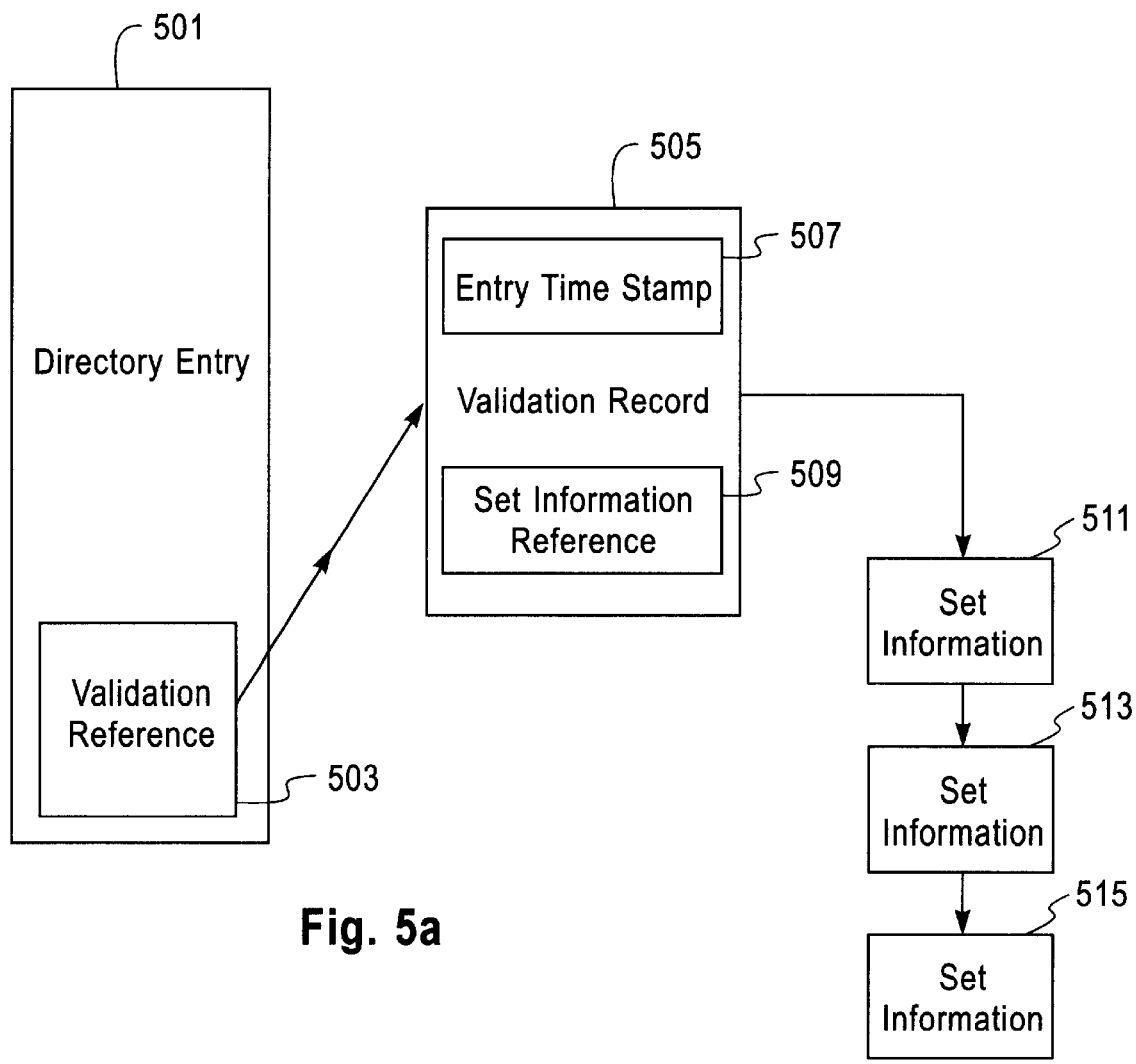
FIG. 5 shows an example block diagram showing the different kinds of information used to implement the validation algorithm in accordance with the present invention.

FIG. 5(a) shows an example of different types of information that is often required to be stored at a repository in order to validate records. FIG. 5(a) shows the data structures required in the repository for the purpose of the validation of a record 501. The record 501 includes a validation reference 503 to a validation record 505. The validation reference 503 is an attribute in the record 501. The validation record 505 is a directory record which includes information used to verify and validate the record 501. The validation record includes two attributes. One of the attributes is the entry time-stamp 507. This is the time when the record 501 was created or modified. The other attribute is a set information reference 509 which points to a list including set information records 511, 513, 515. A record may be valid as a member of several different sets of records. The validation information for record 501 for each of the sets is included in a set information record. Many such set information records may be associated with a single validation record.

An example of the structure of set information records 511, 513, 515 is shown in FIG. 5(*b*). A set information record includes a validator's identity 517, a validation sequence number 519, a validation set identifier 521, and an optional validation record hash/checksum/signature 523. The validator's identity 517 has information that can identify the validator which created the set information record.

The validation sequence number 519 is a unique number generated by the validator. This field identifies when the validator was doing the validation information.

The validation set identifier 521 identifies other records which have been verified to be consistent with the specific policy entry 501. The validation set identifier 521 may enumerate all the records in the set, or it may include the short name or reference of another record which enumerates the set of records. The validation set identifier may also be a special keyword which may indicate specific common sets, e.g. a set including only the directory record 501. The optional validation record hash/checksum/signature 523 is used to provide secure validation of the directory entry. It can include a hash of the attributes in the set information record, including the modification time 507. The hash may be a cryptographic hash, or a simple checksum computed using non-cryptographic methods such as a CRC checksum. It could also be a cryptographic signature of the entries of the set information record and the modification time 507. The attribute 523 provides both the type of hash or checksum or signature that is being used, and actual hash itself. A variety of methods to generate checksums that can be validated using public keys or certificates of the validator are well-known in the prior art.

The type of information included in the set information record depends on the level of trust that is assumed in the network. Some network infrastructures may be trusted, and the threat of deliberate malicious modification of directory entries may not be a concern. In such a secure network, the goal of validation may be to ensure that there are no accidental inconsistent records in the repository introduced by the network administrators. In other networks, which may be called insecure networks, the set information record may include a cryptographic hash or signature to guard against attempts to maliciously change repository records. In a secure network, it often suffices to ensure that time-stamp stored in the validation record of any record is identical to the actual modification or creation time of the record itself.

Figure 6:
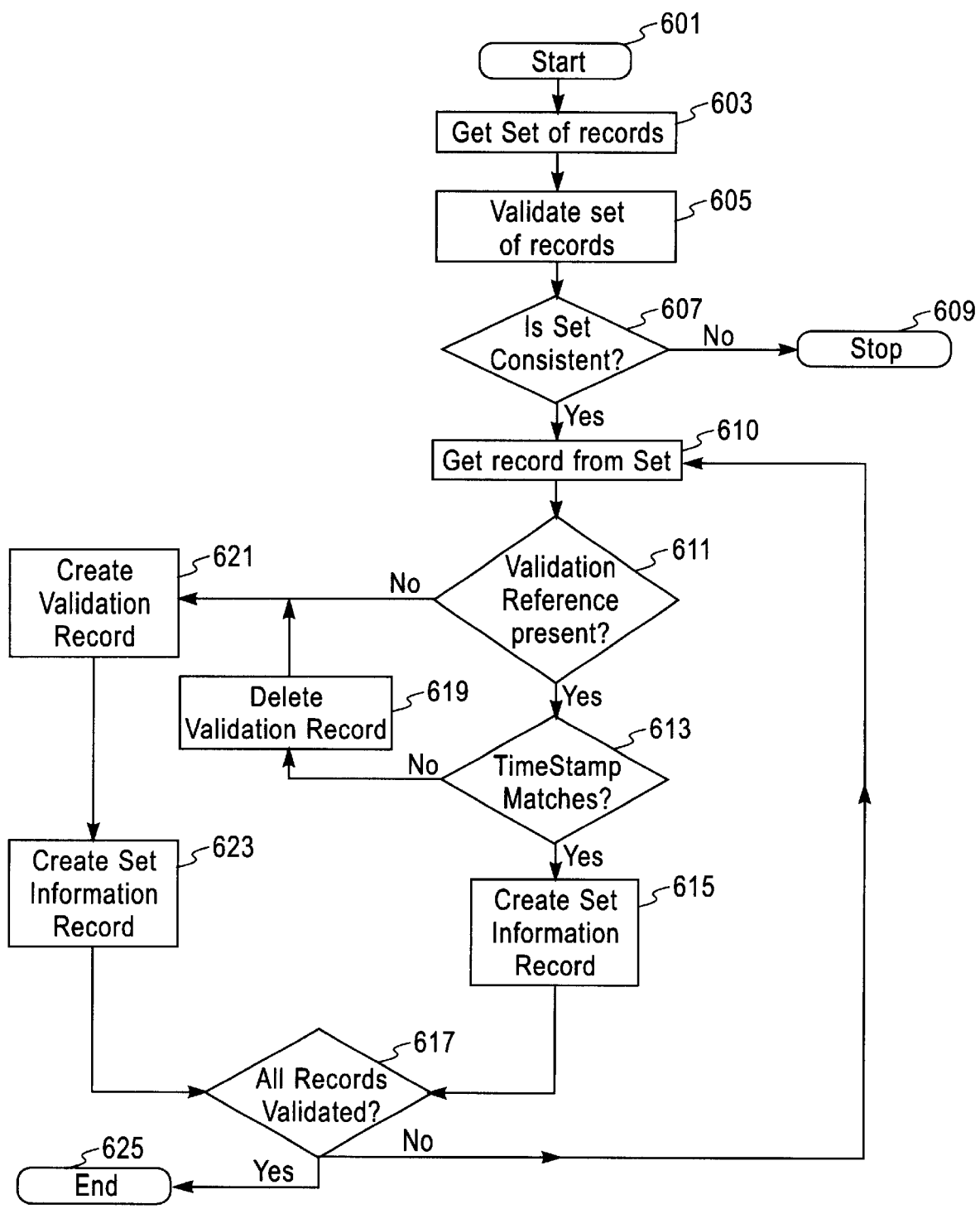
FIG. 6 shows an example flow diagram that illustrates the steps taken when a third party validator validates an entry in a remote repository in a network in accordance with the present invention.

FIG. 6 shows an example of steps that may be used by a third party validator in order to create the appropriate validation information for a set of records. The method is entered in step 601 by a third party validator. In step 603, the validator obtains the set of records that is to be validated. In the next step 605, the validator runs a consistency check (e.g. like the one described in FIG. 3) which checks that the set of entries fetched in step 601 are consistent. In step 607, the outcome of step 605 is examined. If the records are not found to be consistent, the validation step terminates with failure in step 609. If the records are found to be consistent, validation records are created or modified for each record in the set as follows.

In step 610, the first record in the set is selected and removed from the set. In step 611, it checks if a validation record for the selected record already exists. This is done by checking that the validation reference attribute is present in the directory entry. If the validation reference attribute is not present in the record or the validation record identified by the validation reference is not present in the directory, then in step 621, a validation reference and a new validation record is created for the record.

In step 623, a set information record is created for the current set of records. If as a result of step 611, a validation record is found, step 613 checks that the entry time-stamp included in the validation record and the modification or creation time-stamp of the record selected in step 610 are identical. If the time-stamps are found to be identical, then in step 615 a new set information record is created and is linked with the validation record. If in step 613 the time-stamps are found to be different, the flow deletes the existing validation record for the entry, and all associated set information records in step 619. It then continues to step 621 where a new validation record is created. After step 623, the flow checks in step 617 to see if validation records for all the records in the set have been updated. If not, the flow repeats from step 610 for another record in the set. If all the records have been validated in step 617, the flow terminates with success in step 625.

Figure 7:
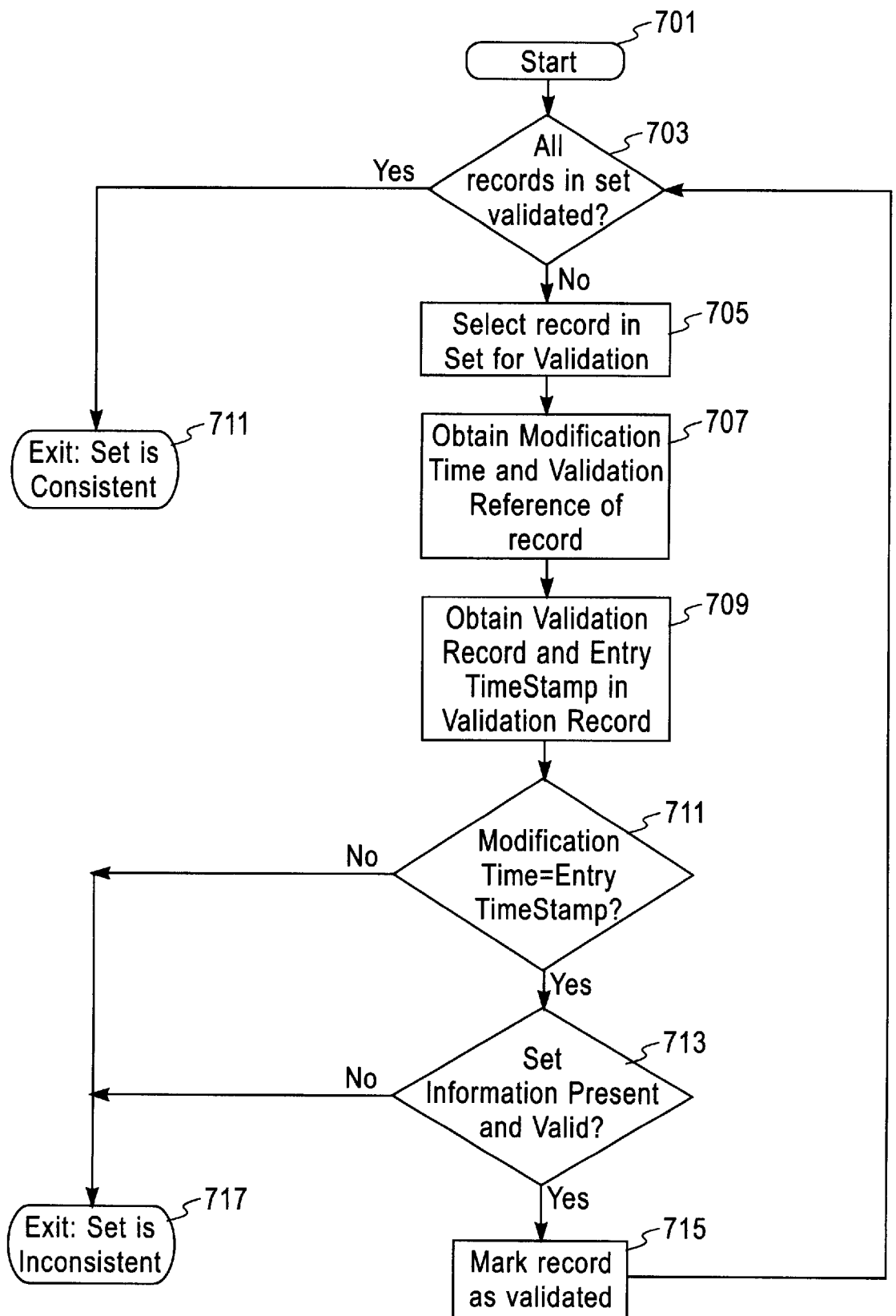
FIG. 7 shows an example flow diagram that illustrates steps taken when a network element verifies the validation information obtained from the central repository in accordance with the present invention.

When a network element has to verify that a set of records it is working with is consistent, it may use an embodiment with a flow diagram as shown in FIG. 7. The flow is entered in step 701 by a network element attempting to validate a set of repository records. In step 703, the network element checks to see if it has validated each record in the set. If so, the flow terminates in step 711. Otherwise, in step 705 a record which is a member of the set but not yet validated is selected. The modification or creation time and the validation reference attributes of the record are obtained in step 707. In step 709, the validation record identified by the validation reference is obtained, and the entry timestamp in the validation record.

In step 711, a verification is made to ensure that the entry time-stamp included in the validation record and the modification time or creation time of the record are identical. If they are not identical, the flow terminates in step 717 with the set of records being deemed inconsistent. If the two time-stamps are identical, in step 713 a check is made to determine that a valid set information record for the selected set of entries exists in the list pointed by set information reference attribute in the validation record. If a set information record is not found in step 713, flow terminates in step 717 with the set of records being deemed inconsistent. If the set information record is found, then in step 715 this record is marked as validated in the context of the current execution of the flow, which then continues with step 703.

The check for validity of the set information record in step 709 depends on the security model assumed in the network. In an embodiment wherein a relatively secure network is assumed, the method checks that the set information record exists, or validate the non-cryptographic checksum. If the network is considered relatively insecure, the validation flow verifies that the cryptographic hash or checksum is formed correctly.

When a complex step such as validation is performed by a third-party validator, there is a danger of the process not completing properly due to unexpected failures at the validator. There is also a possibility of multiple validators attempting to create validation records for the same entry at the same time. In order to address these concerns, a fault-tolerant method of validation is used as an extension to the basic third party validation method.

Figure 5B:
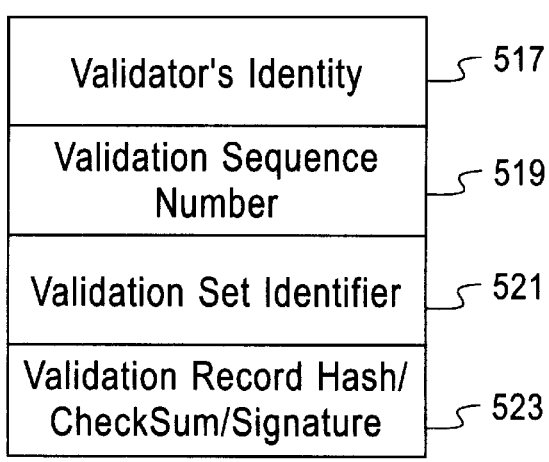
Figure 8:
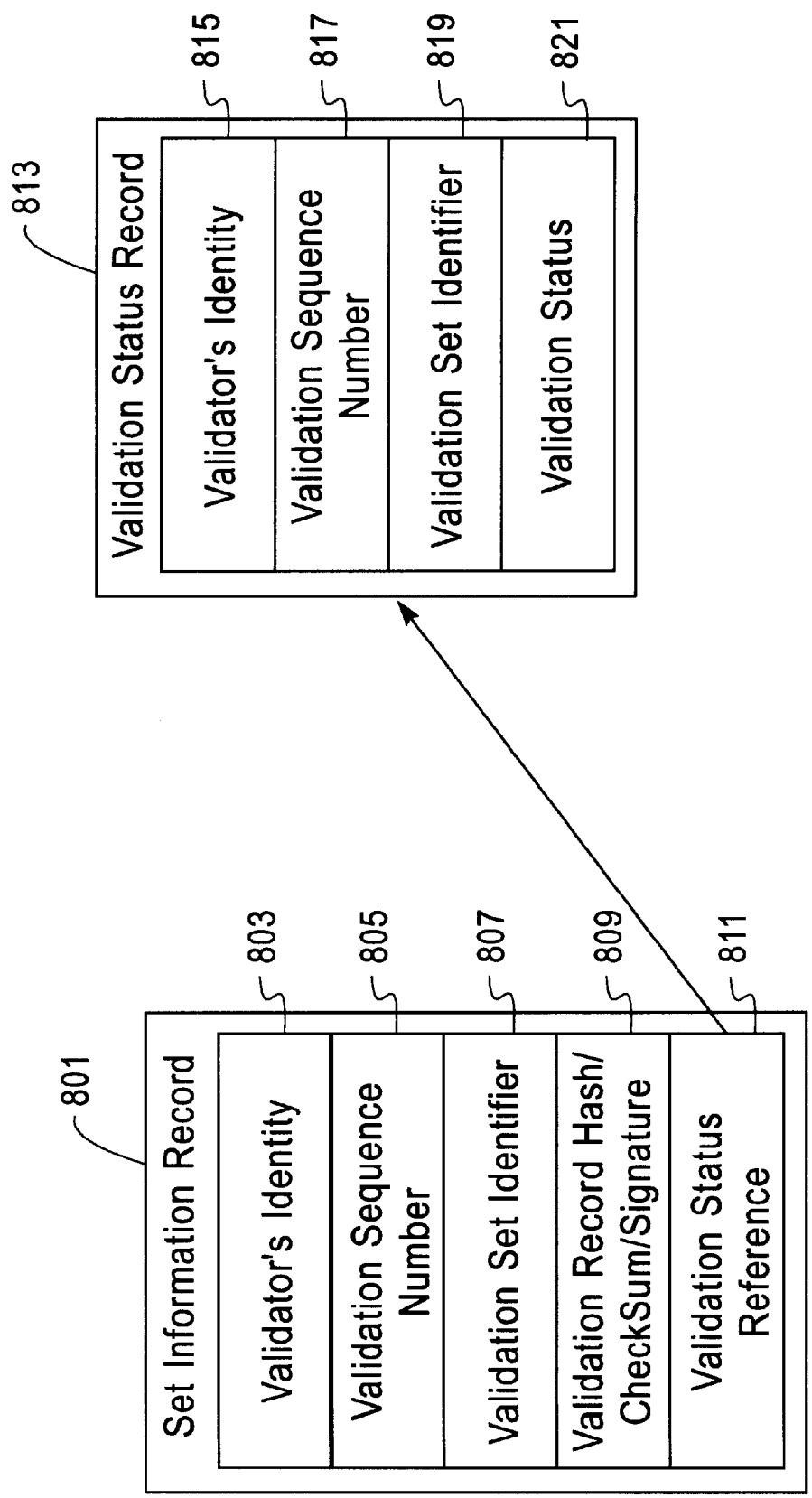
FIG. 8 shows an example block diagram showing the different kinds of information stored at the central repository in order to implement a validation framework in a fault-tolerant manner in accordance with the present invention.

FIG. 8 shows an example of a basic set of information used to provide fault tolerant third-party validation. In this example, the set information record for third-party validation is augmented with an additional attribute which is a reference to a validation-status record. The augmented set information record 801 includes the original attributes as shown in FIG. 5(b) namely the validator's identity 803, the validation sequence number 805, the validation set identifier 807, the validation checksum/hash/signature 809. In addition, it includes a validation status reference 811, which points to a validation status record 813. The validation status record 813 consists of the following attributes: a validator's identity 815, a validation sequence number 817, a validation set identifier 819, and a validation status 821.

The validation status record is a new type of entry stored in the directory. The validation status record is created when a third-party record validator initiates the validation flow. The validation status record includes an indication that the validation is in-progress. The in-progress indication generally has a predetermined value that indicates that the validation status is in progress. After the validation flow is completed, the in-progress validation status is changed to a completed validation status. The completed validation status is indicated by a different predetermined value than the predetermined value that indicates in-progress. There is an advantage of creating a separate record for validation status instead of storing the status in the set information record. When a separate record for validation status is created, the status fields of all the set information records are updated in a single directory update operation performed on the validation status record. Storing the status in the set information record generally needs separate updating for each record in the multiple set information records.

Figure 9:
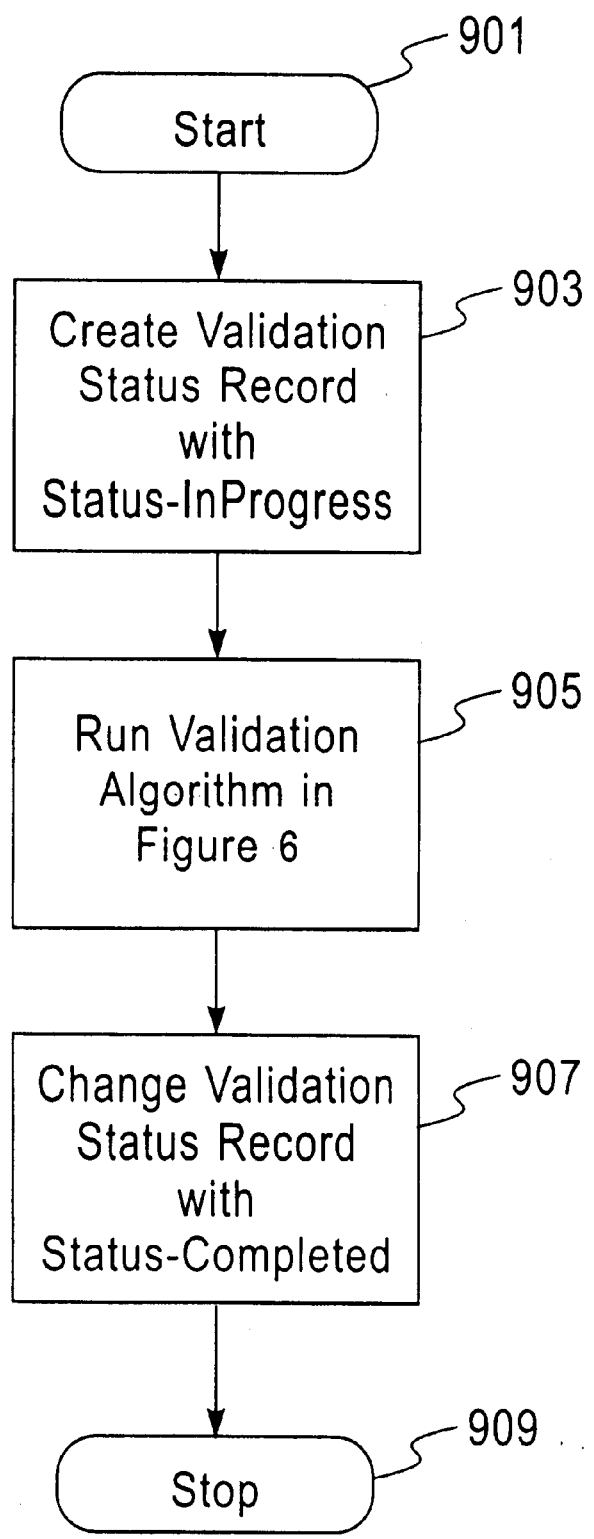
FIG. 9 shows an example flow diagram that illustrates the steps taken when a third party validates an entry in a central repository in a fault-tolerant manner in accordance with the present invention.

FIG. 9 shows an example of the flow of steps involved by a third-party validator when it creates the validation information in a fault-tolerant manner. The flow is entered in step 901 when a third-party record validator needs to validate a set of repository records. In step 903, the record validator creates a validation status record. The validation status record is created with the identity of the record validator, a validation sequence number, the validation set identifier which identifies the set of entries being validated, and the validation status which is set to indication that the validation is in progress. In step 905, the validation outlined in FIG. 6 is executed. During the execution of step 905, an additional step is taken during step 615. This step creates the set information record for each record. During the creation of the set information record, the attribute validation status reference is set to point to the validation status record created in step 903. After the completion of step 905, the flow executes step 907 in which the validation status attribute is set to indicate that the validation has been completed. Then the flow terminates in step 909.

To those skilled in the state of the art, it would be clear that modifications may be readily made to the flow presented in step 909. For example, the validation status record may be removed in a case in which the set of entries is not found to be consistent. Similarly, the time-of-day value may be used to indicate a unique validation sequence number instead of a sequence number that is updated.

Figure 10:
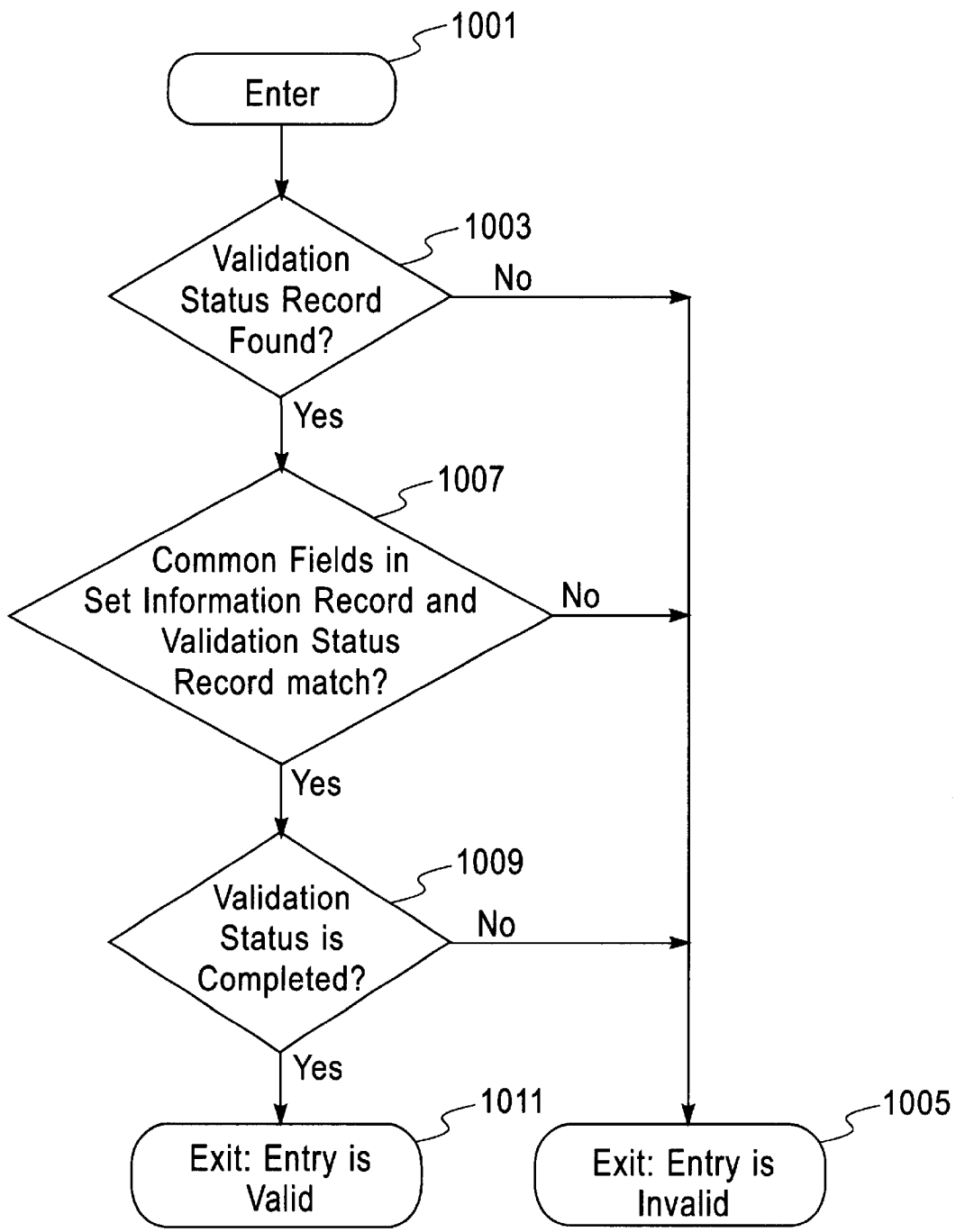
FIG. 10 shows an example flow diagram that illustrates the steps taken when a network element verifies the validation information from a repository in a fault-tolerant manner in accordance with the present invention.

FIG. 10 shows an example flow diagram of steps executed by a network element to verify that a set of records are valid and have been validated in a fault-tolerant manner. This uses a verification step added to the steps of FIG. 7. The additional verification step is performed in step 713 of FIG. 7, where the set information record is being verified. The additional verification step is entered in step 1001 of FIG. 10, after the usual verification of set information record in step 713. In step 1003, the validation status record pointed to by the validation status reference attribute in the set information record is obtained. If such a record does not exist, the set information record is deemed invalid, and flow terminates in step 1005. If the validation status record is found, its common fields are compared against those in the set information record in step 1007. If the fields do not match, the set information record is deemed to be invalid, and the flow terminates in step 1005. Otherwise, the validation status attribute is checked to see that it is "Completed" in step 1009. If so, the set information record is considered valid, and flow terminates in step 1011. Otherwise, the information record is considered invalid, and flow terminates in step 1005.

Figure 11:
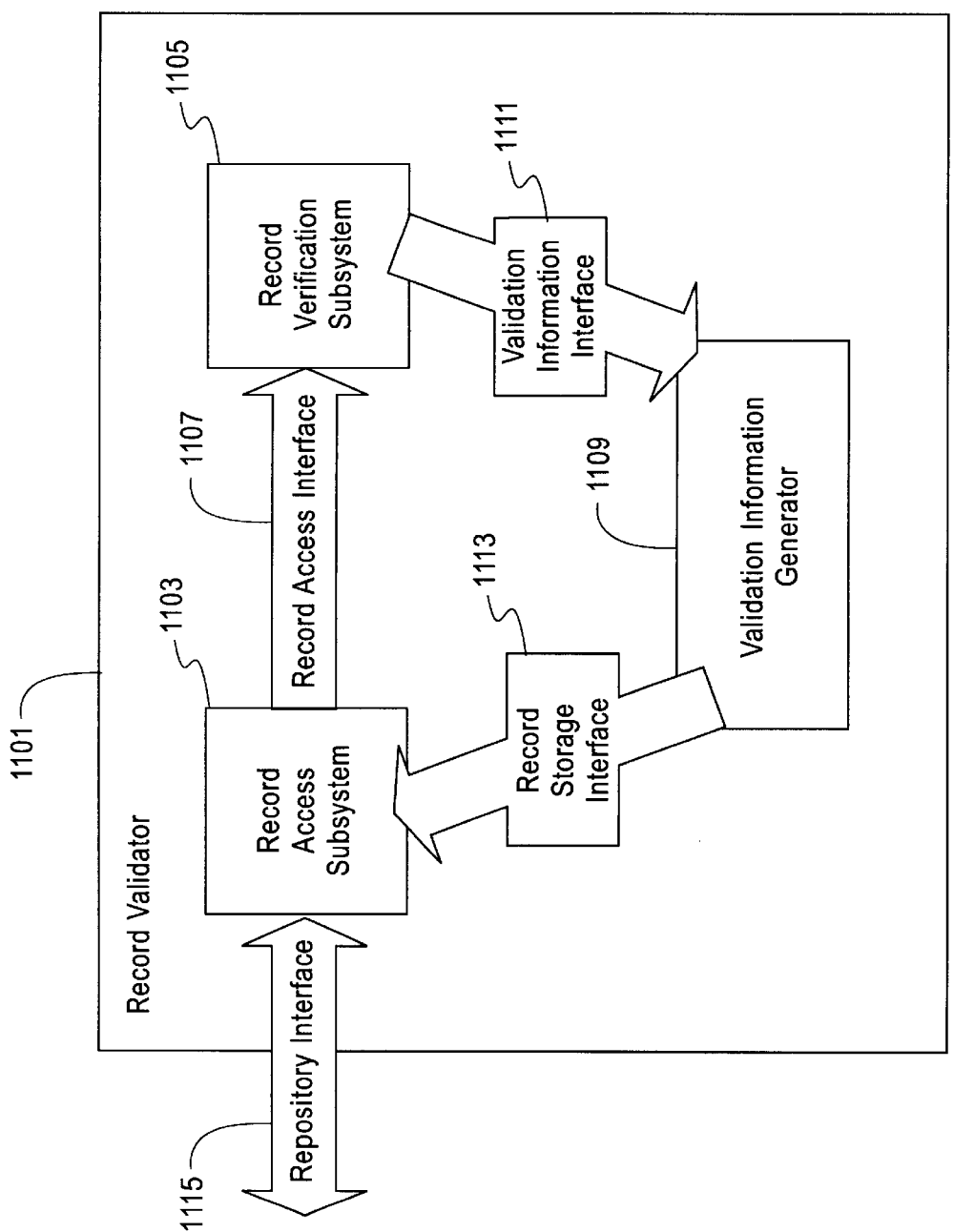
FIG. 11 shows an example of an apparatus used to implement a record validator in accordance with the present invention.

FIG. 11 shows an example of an apparatus used to implement a record validator as described in this invention. The record validator 1101 consists of a record access subsystem 1103 which communicates with the repository to obtain and store records in the repository. The record validator has a record verification subsystem 1105 which obtains repository records using the repository interface 1115 from the record access subsystem 1103 via the record access interface 1107. The record verification subsystem 1105 interfaces with a validation information generator 1109 via the validation information interface 1111. The validation information generator 1109 interfaces with the record access subsystem via the record store interface 1113. In order to validate a policy, the record validator obtains a set of records from the repository using the record access subsystem 1103.

The set of records is delivered via the record access interface 1107 to the record verification subsystem 1105, which validates the set of records. The validated set of records is passed to the validation information generator subsystem 1109 via the validation information interface 1111. The validation information generator 1109 creates a set of record validity information which is passed via the record store interface 1113 to the record access subsystem 1103, and stored in the repository via the repository interface 1115.

Figure 12:
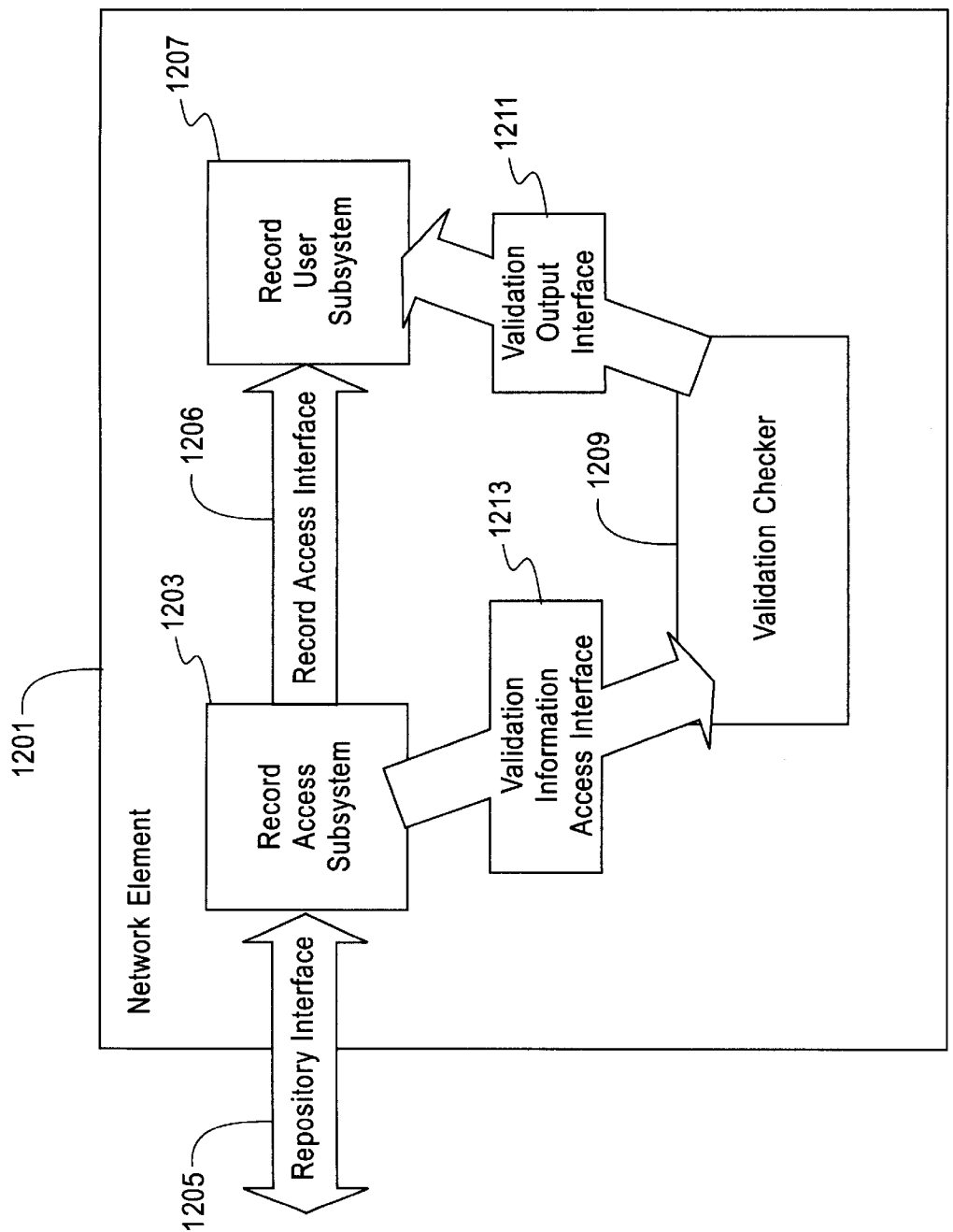
FIG. 12 shows an example of an apparatus used to implement the network element using the third-party validation in accordance with the present invention.

FIG. 12 shows an example of an apparatus used to implement the network element using the third-party validation as described in this invention. The network element 1201 consists of three subsystems, a record access subsystem 1203, a record use subsystem 1207, and a validation checker subsystem 1209. The record access subsystem obtains a set of records and validation information from the repository using the repository interface 1205. The set of records is passed via the record access interface 1206 to the record use subsystem 1207. The set of validation information is passed via the validation information access interface 1213 to the validation checker 1209. The results of the validation checker 1209 are communicated via the verification output interface 1211 to the record user subsystem 1207. The user subsystem 1207 uses the records passed to it via the record access interface 1206 only if the results passed over the verification output interface 1211 indicate that the above-mentioned set of records is valid and consistent.

While the invention has been described in terms of particular embodiments, those skilled in the state of the art will recognize that the invention can be practiced with modification within the spirit and scope of the appended claims.

Having thus described my invention, what I claim as new and desire to secure by Letters Patent is as follows:

1. A method for validating a set of records stored in a repository comprising:

a record validator verifying the validity of the set of records and forming record validation information for each of the records;

the record validator storing the resulting record validation information in the repository; and a network element employing the record validation information;

wherein the step of verifying the validity of a set of records includes verifying that a relation constraint for at least one of the records in the set of records is satisfied.

2. A method as recited in claim 1, wherein the repository is a network directory.

3. A method as recited in claim 2, wherein the network directory supports LDAP.

4. A method as recited in claim 1, wherein the step of storing includes storing separate record validation information for each of the records in the set.

5. A method as recited in claim 4, wherein the record validation information for at least one of the records in the set includes a time of creation or modification of the record.

6. A method as recited in claim 4, wherein the record validation information for at least one record includes a checksum.

7. A method as recited in claim 5, wherein the record validation information for at least one record includes a cryptographic signature having the time of creation or modification of said at least one of the records.

8. A method as recited in claim 4, wherein the record validation information for at least one of the records is stored in a new record in the repository.

9. A method as recited in claim 8, wherein the step of storing comprises modifying said at least one of the records to include a reference to the new record.

10. A method as recited in claim 8, wherein the new record includes a time of creation or modification of said at least one of the records.

11. A method as recited in claim 8, wherein the new record includes a reference to a set information record.

12. A method as recited in claim 11, said method further comprising:

the record validator verifying the validity of a second set of records including said at least one record and forming a second record validation information for said at least one record; and storing the second record validation information in the repository.

13. A method as recited in claim 1, wherein the step of verifying the validity of a set of records further includes:

verifying that a schema constraint for a record in the set of records is satisfied;

verifying that a value constraint for a record in the set of records is satisfied; and verifying that a consistency constraint for the set of records is satisfied.

14. A method as recited in claim 1, wherein the step of verifying the validity of a set of records includes verifying that a value constraint for a record in the set of records is satisfied.

15. A method as recited in claim 1, wherein the step of verifying the validity of a set of records includes verifying that a consistency constraint for the set of records is satisfied.

16. A method as recited in claim 1, wherein the repository is in a network and the step of verifying includes verifying that network policies are consistent and well-formed.

17. A repository of records comprising:

a storage module having a set of records;

a record validator to validate each record in the set of records and generate record validation information; and a network element to employ the record validation information, by verifying that a relation constraint for at least one of the records in the set of records is satisfied.

18. A repository as recited in claim 17, wherein the repository is a network directory.

19. A method for providing fault-tolerant third-party validation by a record validator in a repository comprising:

obtaining a set of records from the repository;

validating the set of records;

creating a validation status record indicating an in-progress validation status of the set of records;

forming validation information for the set of records;

storing the validation information in the repository; and adding at least one reference to the in-progress validation status to the validation status record.

20. A method as recited in claim 19, wherein the step of validating includes:

verifying that a schema constraint for at least one of the records is satisfied;

verifying that a value constraint for at least one of the records is satisfied;

verifying that a relation constraint for at least one of the records is satisfied; and verifying that a consistency constraint for at least one of the records is satisfied.

21. A record validator for a repository comprising:

a record access subsystem to obtain and store records from the repository;

a record verification subsystem to verify a validity of a set of records, by verifying that a relation constraint for at least one of the records in the set of records is satisfied; and a validation information generator to generate a set of record validation information to be stored in the repository.

22. A network element employing record validation information in a repository comprising:

a record access subsystem to obtain and store records from the repository;

a validation checker subsystem to obtain and verify a validity of a set of record validation information for at least one of the records, by verifying that a relation constraint for at least one of the records in the set of records is satisfied; and a record user subsystem to use said at least one of the records if the validation checker subsystem verifies the set of record validation information to be valid.

23. An article of manufacture comprising a computer usable medium having computer readable program code means embodied therein for validating a set of records stored in a repository, the computer readable program code means in said article of manufacture comprising computer readable program code means for causing a computer to effect:

a record validator verifying the validity of the set of records and forming record validation information for each of the records by verifying that a relation constraint for at least one of the records in the set of records is satisfied;

the record validator storing the resulting record validation information in the repository; and a network element employing the record validation information.

24. A computer program product comprising a computer usable medium having computer readable program code means embodied therein for causing fault-tolerant third-party validation by a record validator in a repository, the computer readable program code means in said computer program product comprising computer readable program code means for causing a computer to effect:
   obtaining a set of records from the repository;
   validating the set of records;
   forming validation information for the set of records;
   creating a validation status record indicating a present validation status of the set of records;
   storing the validation information in the repository; and
   adding at least one reference to the present validation status to the validation status record.

25. A method for a record validator to provide third-party validation of a set of records in a repository, the method comprising:
   obtaining the set of records from the repository;
   the validator validating the set of records;
   creating a validation status record indicating an in-progress validation status of the set of records;
   forming validation information for at least one of the records in the set of records;
   storing the validation information for said at least one record in the repository; and
   adding at least one reference to the in-progress validation status to the validation status record for said at least one record.

26. The method as recited in claim 25, further comprising:
   repeating the steps of forming, storing and adding for at least one other record in the set of records; and
   replacing the in-progress validation status with a completed validation status.

27. A method as recited in claim 25, wherein at least one of the steps includes employing a fault-tolerant implementation.

28. A computer program product comprising a computer usable medium having computer readable program code means embodied therein for causing a record validator to provide third-party validation of a set of records in a repository, the computer readable program code means in said computer program product comprising computer readable program code means for causing a computer to effect:
   obtaining the set of records from the repository;
   the validator validating the set of records;
   creating a validation status record indicating an in-progress validation status of the set of records;
   forming validation information for at least one of the records in the set of records;
   storing the validation information for said at least one record in the repository; and
   adding at least one reference to the in-progress validation status to the validation status record for said at least one record.

29. A computer program product as recited in claim 28, the computer readable program code means in said computer program product further comprising computer readable program code means for causing a computer to effect:
   repeating the steps of forming, storing and adding for at least one other record in the set of records; and
   replacing the in-progress validation status with a completed validation status.

30. A method comprising validating a set of records stored in a repository, the method including:
   a record validator verifying the validity of the set of records and forming record validation information for each of the records by verifying that a relation constraint for at least one of the records in the set of records is satisfied;
   the record validator storing the resulting record validation information in the repository; and
   a network element retrieving at least one partial record from the set of records employing the record validation information.

31. An apparatus comprising a repository of records including:
   a storage module having a set of records;
   a record validator to validate each record in the set of records and generate record validation information; and
   a network element to employ the record validation information by verifying that a relation constraint for at least one of the records in the set of records is satisfied, said network element being a partial record from the set of records.

32. A method for validating a set of records stored in a repository comprising:
   a record validator verifying the validity of the set of records and forming record validation information for each of the records;
   the record validator storing the resulting record validation information in the repository; and
   a network element employing the record validation information;
   wherein the step of storing record validation information comprises:
      storing a validation record reference in a first record of the set of records;
      creating a validation record for the first record in the repository;
      creating a set information reference in the validation record; and
   creating a set information record in the repository.

33. A method as recited in claim 32, wherein the validation record includes an entry time-stamp specifying when the first record was created or modified.

34. A method for validating a set of records stored in a repository comprising:
   a record validator verifying the validity of the set of records and forming record validation information for each of the records;
   the record validator storing the resulting record validation information in the repository; and
   a network element employing the record validation information,
   wherein said step of employing includes comparing an entry time-stamp stored in the record validation with a time of modification or creation of at least one record.

35. A repository of records comprising:
   a storage module having a get of records;
   a record validator to validate each record in the set of records and generate record validation information, said record validator verifying that a relation constraint for at least one of the records in the set of records is satisfied; and
   a network element to employ the record validation information.

36. An article of manufacture comprising a computer usable medium having computer readable program code means embodied therein for validating a set of records stored in a repository, the computer readable program code means in said article of manufacture comprising computer readable program code means for causing a computer to effect:

a record validator verifying the validity of the set of records and forming record validation information for each of the records, by verifying that a relation constraint for at least one of the records in the set of records is satisfied;

the record validator storing the resulting record validation information in the repository; and a network element employing the record validation information.

* * * * *